US008226454B2

(12) United States Patent
Chen

(10) Patent No.: US 8,226,454 B2
(45) Date of Patent: Jul. 24, 2012

(54) HEAT DISSIPATING ARCHITECTURE FOR MACHINE TOOLS

(75) Inventor: Bach Pangho Chen, Claremont, CA (US)

(73) Assignee: X'Pole Precision Tools Inc., Chung-Li, Taoyuan County (TW)

( * ) Notice: Subject to any disclaimer, the term of this patent is extended or adjusted under 35 U.S.C. 154(b) by 421 days.

(21) Appl. No.: 12/632,350

(22) Filed: Dec. 7, 2009

(65) Prior Publication Data
US 2011/0136420 A1    Jun. 9, 2011

(51) Int. Cl.
*B24B 23/03* (2006.01)
(52) U.S. Cl. .............................. 451/7; 451/357; 451/449
(58) Field of Classification Search .............. 451/7, 357, 451/359, 488, 449
See application file for complete search history.

(56) References Cited

U.S. PATENT DOCUMENTS

| 5,018,314 A | * | 5/1991 | Fushiya et al. ................. 451/357 |
| 5,392,568 A | * | 2/1995 | Howard et al. ................. 451/357 |
| 5,595,531 A | * | 1/1997 | Niemela et al. ................ 451/357 |
| 5,807,169 A | * | 9/1998 | Martin et al. .................. 451/357 |
| 5,947,804 A | * | 9/1999 | Fukinuki et al. ............... 451/357 |
| 6,780,094 B2 | * | 8/2004 | Walker ........................... 451/356 |
| 7,270,598 B2 | * | 9/2007 | Dutterer et al. ............... 451/357 |
| 2009/0239453 A1 | | 9/2009 | Nordstrom |

FOREIGN PATENT DOCUMENTS

| CN | 2887526 Y | 4/2007 |
| TW | M261316 | 4/2005 |
| TW | M288839 | 3/2006 |

* cited by examiner

*Primary Examiner* — Robert Rose
(74) *Attorney, Agent, or Firm* — Muncy, Geissler, Olds & Lowe, PLLC

(57) ABSTRACT

A heat dissipating architecture for a machine tool is provided. The machine tool includes an accommodating space, a tool shaft mounted in the accommodating space, a counter balancing mass having a first balancing portion and a second balancing portion mounted on the tool shaft for causing an eccentric rotation stroke of the tool shaft, and an inlet communicating with the accommodating space. The heat sink is mounted on the counter balancing mass. The heat sink includes a first blade portion corresponding to the first balancing portion, a second blade portion corresponding to the second balancing portion, and a linking portion for connecting the first and second blade portions, such that during the rotation stroke of the tool shaft, the heat sink inhales air via the inlet, transmit the air from the first blade portion to the second blade portion, and then exhausts the air from the second blade portion.

8 Claims, 6 Drawing Sheets

HEAT DISSIPATING ARCHITECTURE FOR MACHINE TOOLS

FIELD OF THE INVENTION

The present invention is related to a heat dissipating architecture for a machine tool, and more particularly to a machine tool heat dissipating architecture which can generate airflow inside the machine tool for dissipating the heat produced during the operation of the machine tool.

BACKGROUND OF THE INVENTION

Since the electric motor was invented, centuries of development and progress thereof have brought about a lot of conveniences for human's daily life. From the original large-sized electric motor for the industrial purpose, the electric motor has now minimized to be used in the commodities or machine tools that might be used every day.

Machine tools commonly used in the industry, such as grinding machines, are mainly driven by the electric motor, as shown in R.O.C. patent Nos. M261316 and M288839. The machine tools disclosed in the above patents both have a main body including a motor and a tool shaft driven by the motor, wherein the tool shaft is equipped with two counter balancing masses to cause an eccentric rotation thereof, and the two counter balancing masses are linked to an actuation element, so that after the motor is switched on, the tool shaft can be driven to have an eccentric rotation and the two linked counter balancing masses can drive the actuation element to operate, thereby achieving the purpose of processing the workpiece. However, during the operation, it is easy that the heat produced by the motor is accumulated inside the machine tool, which not only might overheat the motor to reduce the operation time of the machine tool, but also might influence the durability of the machine tool.

An improvement as shown in China patent No. 2887526Y provided that the main body of the machine tool is formed to have an inlet and an outlet corresponding to the position of the motor, so that the external air can be introduced therein through the inlet and the heat inside can be discharged thereout through the outlet as the motor is operating. Thus, the heat produced by the motor can be dissipated and the problem of heat accumulation also can be solved. However, since the two counter balancing masses and the actuation element also will generate a large amount of heat during operation, and obviously, the structure described in China patent No. 2887526 only can dissipate the heat from the motor, the heat generated by the two counter balancing masses cannot be dissipated by the introduced air. Therefore, the durability of this type of machine tool is still deficient.

In view of above, US publication No. 2009/0239453 disclosed that a heat sink is sleeved around the two lower counter balancing masses, and thus the heat sink can operate synchronously with the two counter balancing masses for introducing air to dissipate the heat generated by the two counter balancing masses. However, since the blades of the heat sink are mounted around the lower counter balancing masses and at the same height therewith, when the machine tool is operating, the external air may initially enter the machine tool via the vent at the top handle, pass through the control circuit board mounted inside the handle and then turn downward to pass the motor, then be attracted by the heat sink, and finally pass through the counter balancing masses and be exhausted via an outlet. Therefore, practically, the air for passing through the two counter balancing masses has passed through the motor first and possesses a relatively higher temperature, so that the heat produced by the two counter balancing masses cannot be dissipated efficiently. Besides, the flowing path thereof is relatively long and not smooth, both of which might not only reduce the flow rate and flow amount, but also increase the dusts introduced with the external air to contaminate the circuit board and the motor.

SUMMARY OF THE INVENTION

The object of the present invention is to provide a heat dissipating architecture for a machine tool which provides a reduced space occupation in the heat dissipating architecture and reduces the temperature of the counter balancing masses in a more efficient way.

For achieving the object above, the present invention provides a heat dissipating architecture for a machine tool including a machine tool and a heat sink. The machine tool includes an accommodating space, a tool shaft mounted in the accommodating space, a counter balancing mass mounted on the tool shaft, and an inlet communicated with the accommodating space, wherein the counter balancing mass includes a first balancing portion and a second balancing portion for causing the tool shaft to have an eccentric rotation stroke. The heat sink is mounted on the counter balancing mass and includes a first blade portion corresponding to the first balancing portion and a second blade portion corresponding to the second balancing portion, such that during the operation of the tool shaft, the counter balancing mass drives the heat sink to rotate so that the heat sink can inhale air via the inlet, transmits the air from the first blade portion to the second blade portion, and then exhausts the air from the second blade portion. Accordingly, not only the high temperature produced from the counter balancing mass during the operation of the tool shaft can be reduced, the space for mounting the heat sink also can be saved.

According to the description above, the present invention is advantageous of:

1. The external air inhaled by the heat sink during the rotation of the tool shaft is transmitted to the counter balancing mass, so as to reduce the working temperature of the counter balancing mass and maintain the normal operation of the machine tool, thereby increasing the life span of the components inside the machine tool.

2. The first blade portion and the second blade portion of the counter balancing mass respectively correspond to the first balancing portion and the second balancing portion, so that a more efficient application of the accommodating space of the machine tool can be achieved without increasing the volume of the machine tool, thereby facilitating mobility and operation.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 1:
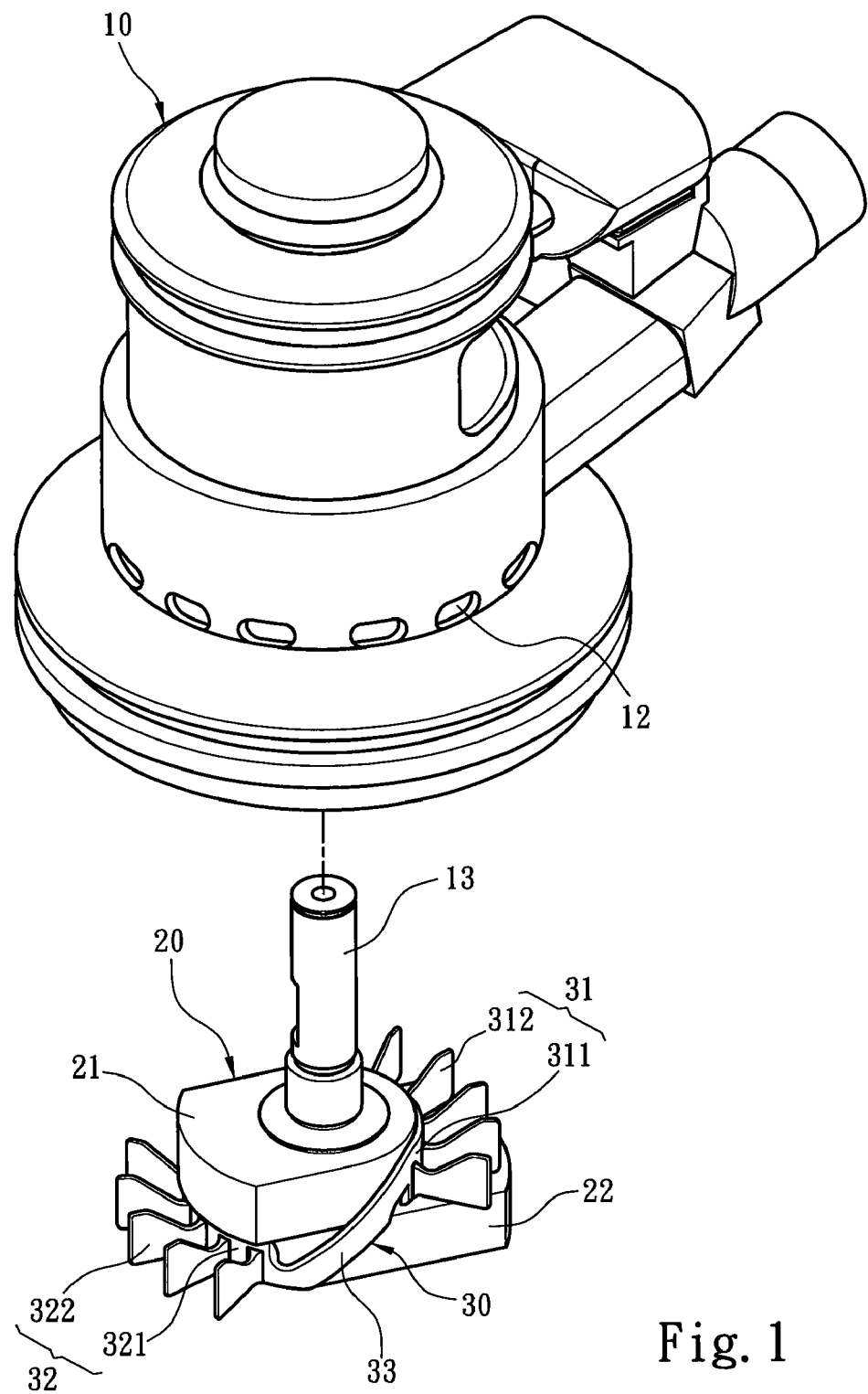
FIG. 1 is a schematic view of a first embodiment according to the present invention.
Figure 2:
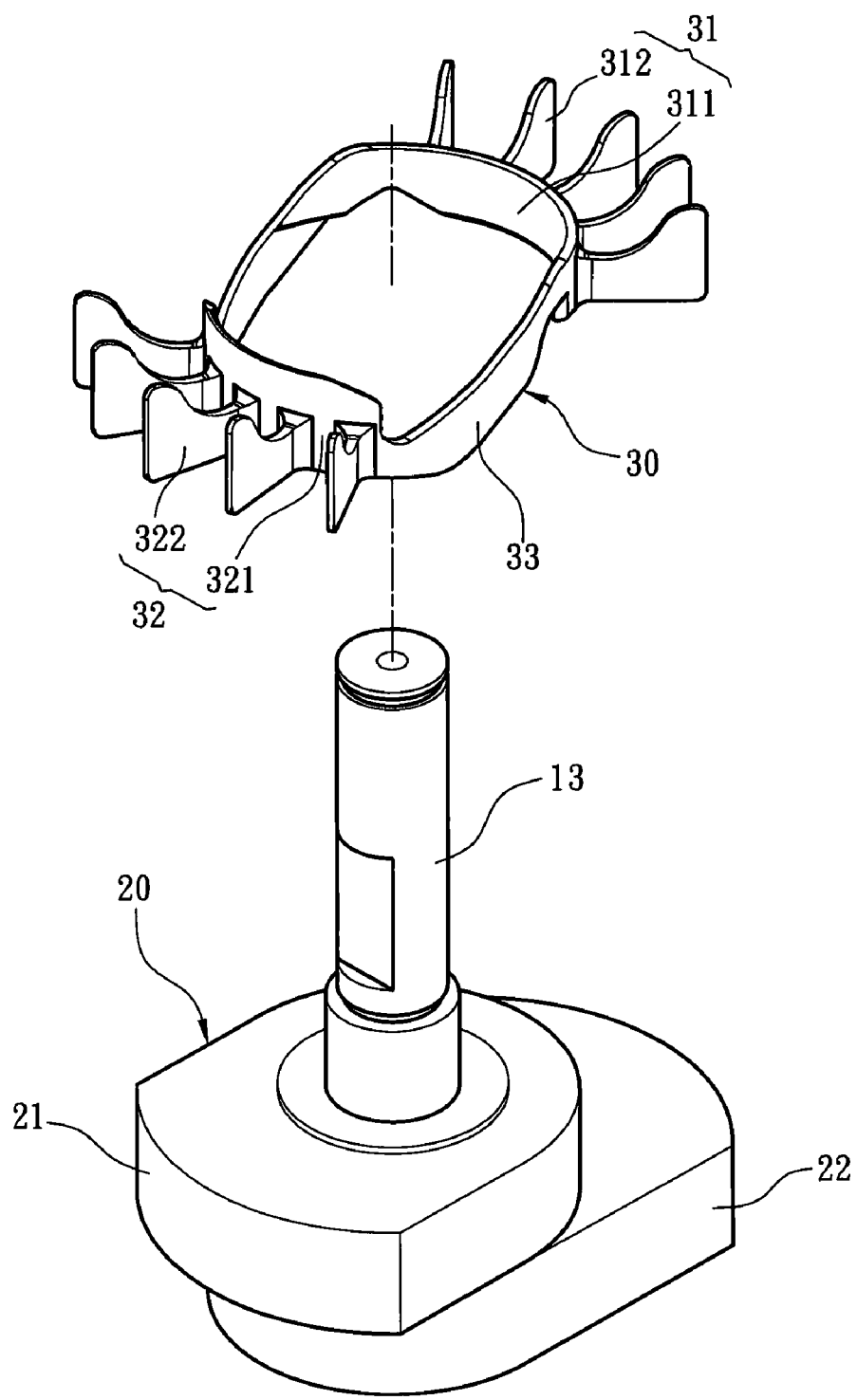
FIG. 2 is another schematic view of a first embodiment according to the present invention.
Figure 3:
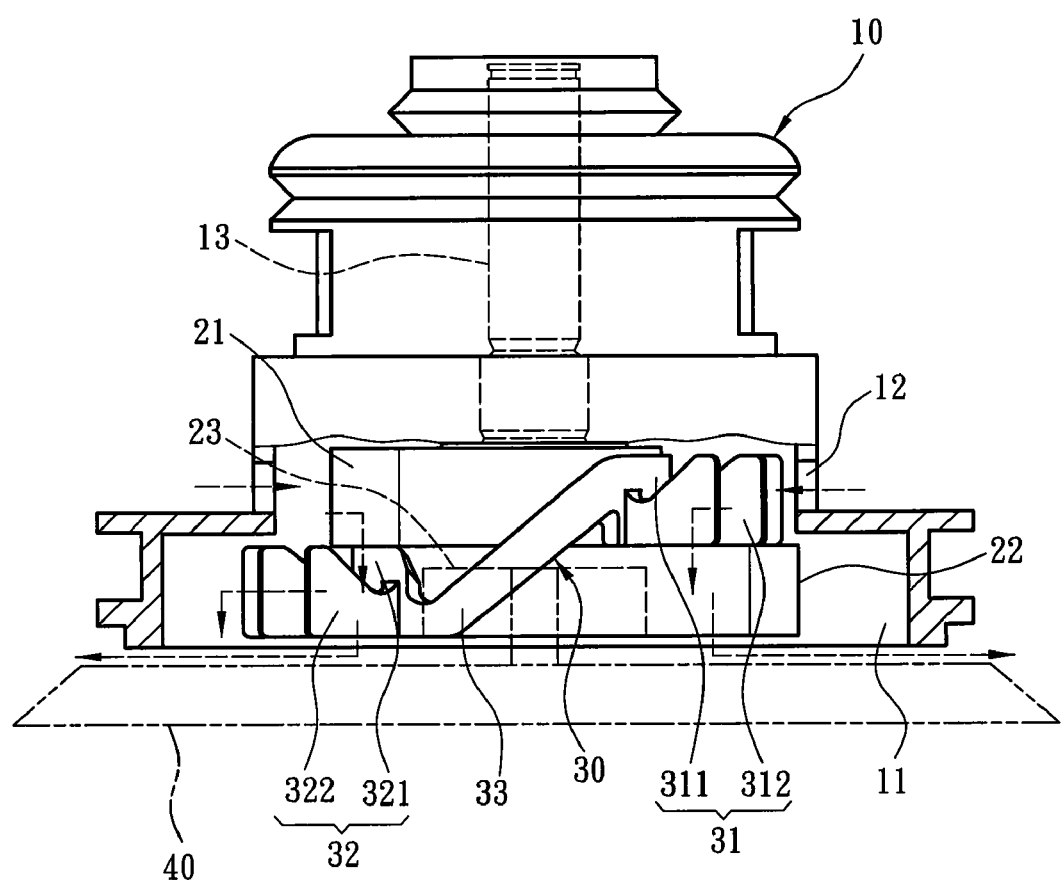
FIG. 3 is a sectional view of a first embodiment according to the present invention.

Please refer to FIG. 1, FIG. 2 and FIG. 3, the present invention is related to a heat dissipating architecture for a machine tool which includes a machine tool 10, a tool shaft 13 mounted in the machine tool 10, a counter balancing mass 20 mounted on the tool shaft 13, and a heat sink 30 mounted on the counter balancing mass 20. The machine tool 10 has an accommodating space 11 and a plurality of inlets 12 communicating with the accommodating space 11, and the tool shaft 13 is mounted inside the accommodating space 11 and is driven to rotate by driving devices, such as a motor, a rotor, a stator and the like (not shown in the drawings), to generate a rotation stroke. The counter balancing mass 20 which is connected to one end of the tool shaft 13 has a first balancing portion 21 and a second balancing portion 22 alternatively overlapped with each other. The respective opposite sides of the first balancing portion 21 and the second balancing portion 22 are outwardly extended and protruded, so that the tool shaft 13 will have an eccentric rotation due to the first and the second balancing portions 21, 22. The heat sink 30 which is mounted on the counter balancing mass 20 includes a first blade portion 31 corresponding to the first balancing portion 21, and a second blade portion 32 corresponding to the second balancing portion 22. In an embodiment of the present invention, the first blade portion 31 and the second blade portion 32 are respectively mounted at the opposite sides of the first balancing portion 21 and the second balancing portion 22, so that the first and second blade portions 31, 32 can have different heights. The first blade portion 31 and the second blade portion 32 respectively includes a rejecting portion 311, 321 against the first balancing portion 21 and the second balancing portion 22, and a plurality of blades 312, 322 mounted on the rejecting portions 311, 321. The heat sink 30 further includes a linking portion 33 for connecting the rejection portion 311 of the first blade portion 31 and the rejection portion 312 of the second blade portion 32 together, so that the rejection portion 311 of the first blade portion 31 and the rejection portion 321 of the second blade portion 32 can compose a concentric circle.

The machine tool 10 of the present invention can be a grinder or any other machine tool which needs a tool shaft 13 having an eccentric rotation. The machine tool 10 further includes an actuation element 40 inside for processing a workpiece, and the actuation element 40 is connected to the counter balancing mass 20 through a bearing 23 inside the counter balancing mass 20. When the machine tool 10 is activated, the tool shaft 13 inside the machine tool 10 will drive the counter balancing mass 20 to generate an eccentric rotation stroke, so as to cause a linking movement of the actuation element 40. When the operation is at a high speed, the bearing 23 inside the counter balancing mass 20 also will constantly drive the actuation element 40 to perform a heavy-loaded eccentric rotation at a high speed, so that the bearing 23 inside will produce a large amount of heat which will then be rapidly transmitted to the counter balancing mass 20 and the tool shaft 13. Therefore, it is easy that the heat is accumulated around the counter balancing mass 20, so as to exceed the heat produced by the driving devices (not shown in the drawings). According to the present invention, while the tool shaft 13 drives the counter balancing mass 20 to operate, the heat sink 30 is synchronously driven by the tool shaft 13 to rotate, and since the inlet 12 has the same height with the first blade portion 31, the rotation of the first blade portion 31 inhales the external air via the inlet 12, and the widths of the blades 312, 322 of the first and second blade portions 31, 32 are gradually reduced along with the direction toward the rejecting portions 311, 321. The air inhaled by the first blade portion 31 will first pass through the first balancing portion 21 to bring away the heat produced by the first balancing portion 21. Then, the air is further transmitted to the lower second blade portion 32, and then transmitted by the second blade portion 21 to the second balancing portion 22 and dissipating the heat of the second balancing portion 22. Finally, the air is exhausted toward the direction of the actuation element 40, so that the high temperature produced by the first balancing portion 21 and the second balancing portion 22 of the counter balancing mass 20 will be exhausted during the rotation of the tool shaft 13. Without affecting the components (such as the motor, the circuit board and the like) inside the machine tool 10, the flowing path can be provided to achieve the heat dissipating for maintaining the normal operation of the machine tool 10, and also prevent the dusts generated by the actuation element 40 from entering into the machine tool 10.

Figure 4:
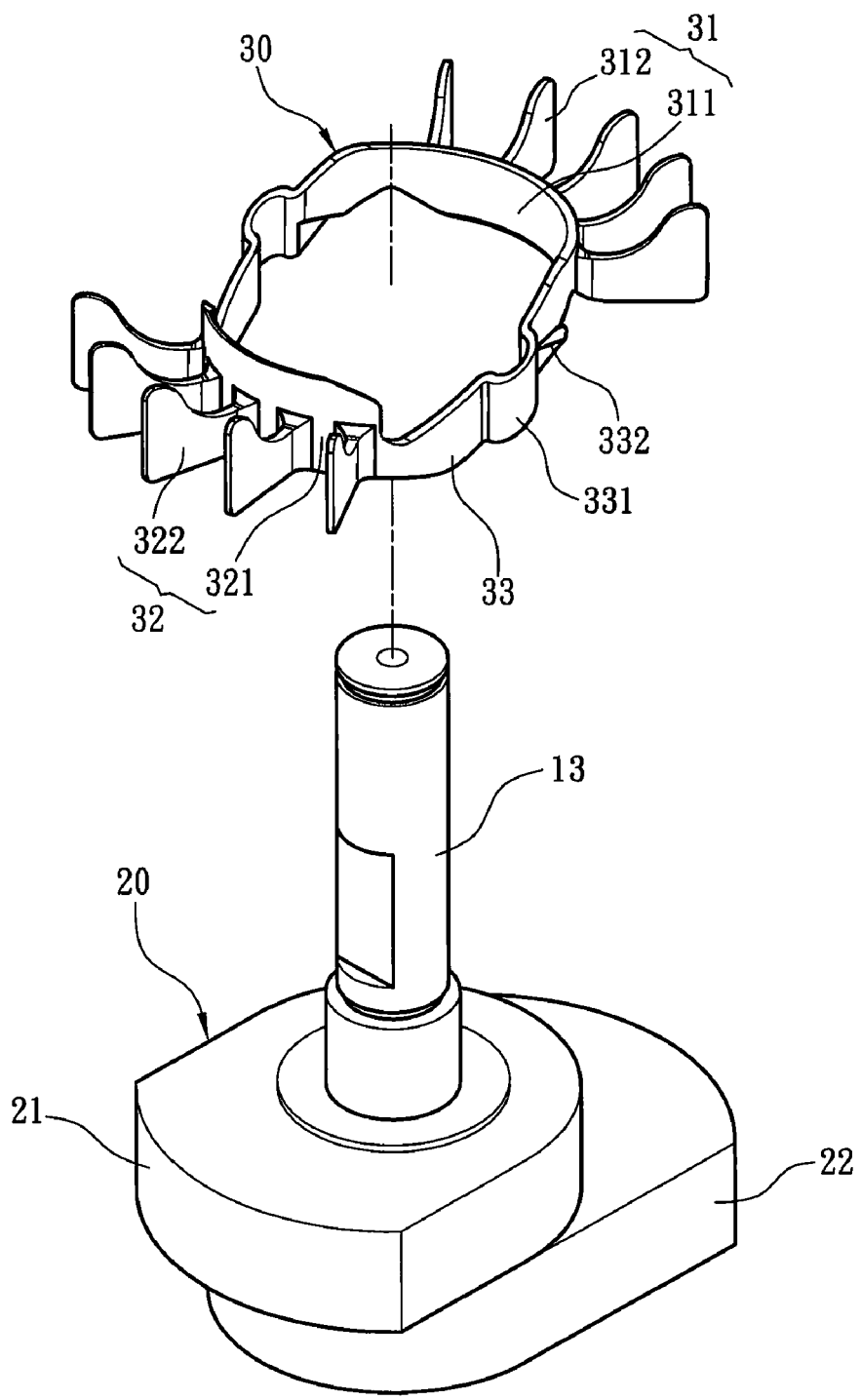
FIG. 4 is a schematic view of a second embodiment according to the present invention.
Figure 5:
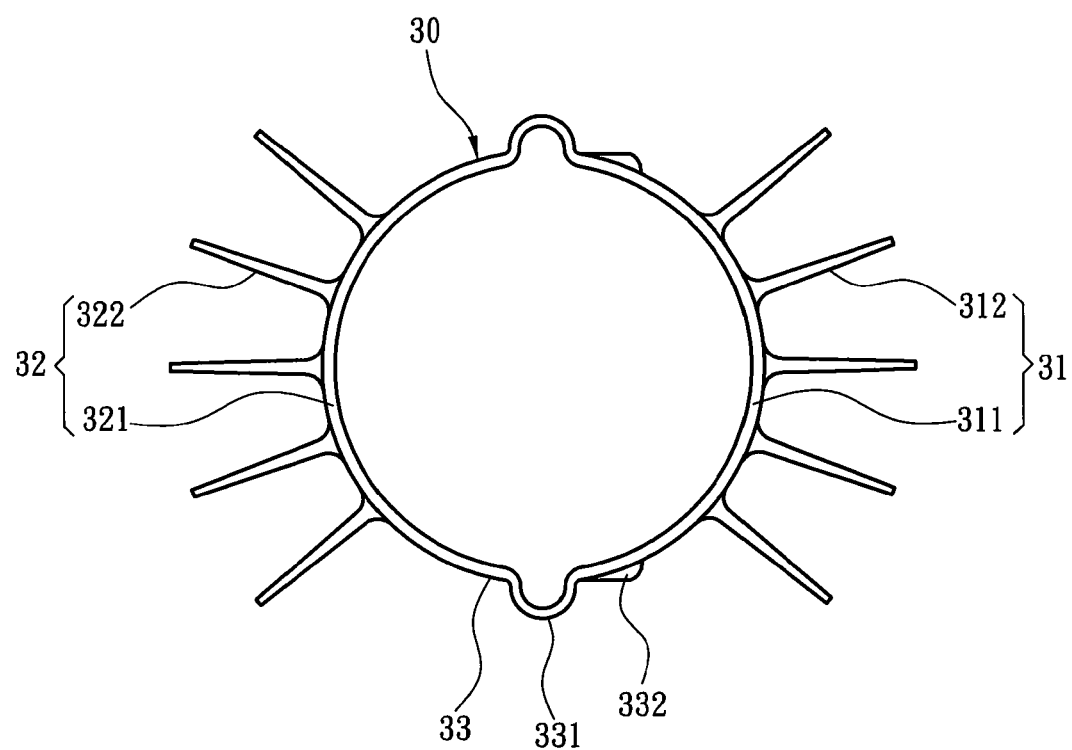
FIG. 5 is a schematic view of a heat sink in a second embodiment according to the present invention.
Figure 6:
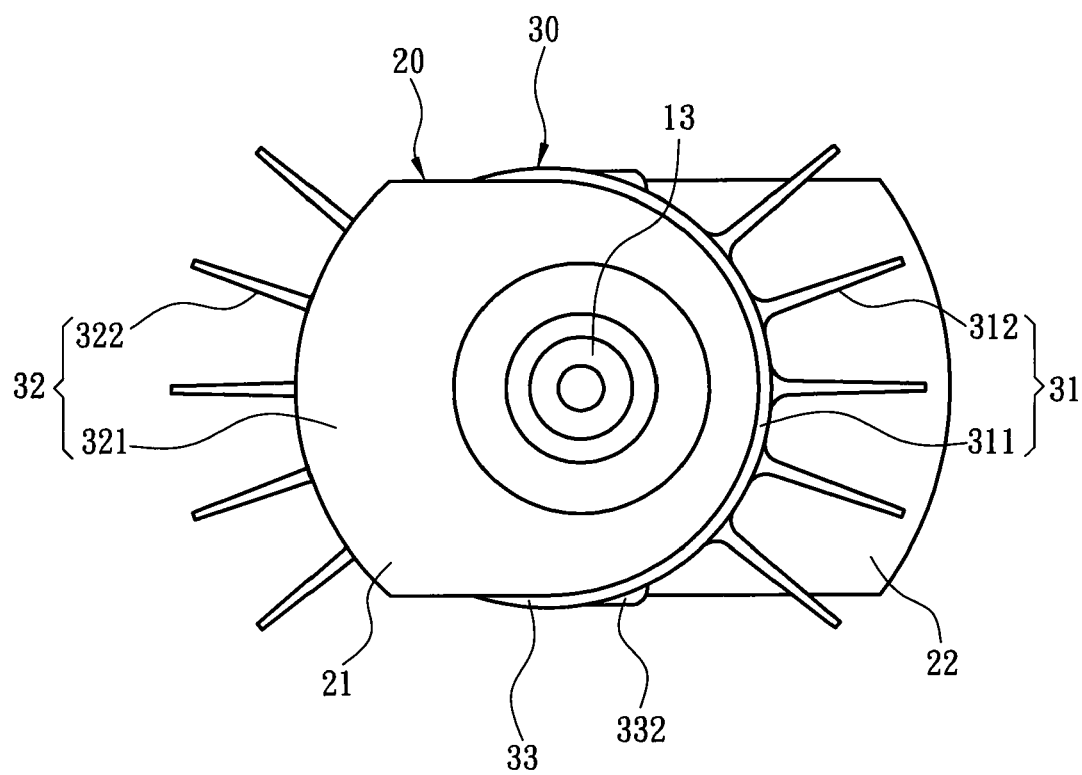
FIG. 6 is a schematic view showing the assembly of a second embodiment according to the present invention.

For avoiding a collision or abrasion between the heat sink 30 and the counter balancing mass 20 during the rotation of the tool shaft 13, the connection therebetween should be firmed. Because the counter balancing mass 20 includes the first balancing portion 21 and the second balancing portion 22 which are extended from two opposite sides thereof, for general users, it is not easy to install the heat sink 30 onto the counter balancing mass 20. Considering this, the heat sink 30 of the present invention also can mount a flexible section 331 on the linking portion 33 of the heat sink 30 as shown in FIG. 4, FIG. 5 and FIG. 6. When assembling, the first blade portion 31 and the second blade portion 32 can be relatively stretched by applying a force via the elasticity of the flexible section 331 in order to increase the distance between the first blade portion 31 and the second blade portion 32, so that the heat sink 30 can be rapidly sleeved on the counter balancing mass 20. Further, by way of the flexible section 331, the first blade portion 31 and the second blade portion 32 then can be recovered to respectively reject against the first balancing portion 21 and the second balancing portion 22. And a positioning portion 332 is further provided on the linking portion 33 for latching with the counter balancing mass 20. Therefore, the heat sink 30 not only can be assembled in an easier way, also can have a stable connection with the counter balancing mass 20.

In the aforesaid, according to the present invention, the heat sink 30 has a first blade portion 31 and a second blade portion 32 respectively corresponding to the first balancing portion 21 and the second balancing portion 22 which are on the tool shaft 13. Owing to a linking portion 33 for connecting the first blade portion 31 and the second blade portion 32 together, so that the air can be inhaled by the heat sink 30 via the inlet 12 during the eccentric rotation stroke of the tool shaft 13, and then the air can be transmitted from the first blade portion 31 to the second blade portion 32 to be exhausted, so that the high temperature produced by the counter balancing mass 20 during the operation of the took shaft 13 can be reduced. Accordingly, the present invention is advantageous of:

1. The external air inhaled by the heat sink 30 during the rotation of the tool shaft 13 can be directly transmitted to the counter balancing mass 20, so as to reduce the working temperature of the counter balancing mass 20 and maintain the normal operation of the machine tool 10, thereby increasing the life span of the components inside the machine tool 10.

2. The first blade portion 31 and the second blade portion 32 of the heat sink 30 are provided correspondingly to the first balancing portion 21 and the second balancing portion 22, so that a more efficient application of the accommodating space 11 of the machine tool 10 can be achieved without increasing the volume of the machine tool 10, thereby facilitating the mobility and operation.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed:

1. A heat dissipating architecture for a machine tool, comprising:
   a machine tool, including an accommodating space, a tool shaft held in the accommodating space, a counter balancing mass mounted on the tool shaft and an inlet communicating with the accommodating space, wherein the counter balancing mass includes a first balancing portion and a second balancing portion for causing the tool shaft to generate an eccentric rotation stroke relative to the machine tool; and
   a heat sink, which is mounted on the counter balancing mass and synchronously rotated with the tool shaft, including a first blade portion corresponding to the first balancing portion, a second blade portion corresponding to the second balancing portion, and a linking portion for connecting the first blade portion and the second blade portion together, such that during the rotation stroke of the tool shaft, the heat sink inhales air via the inlet, transmits the air from the first blade portion to the second blade portion, and then exhausts the air from the second blade portion.

2. The heat dissipating architecture as claimed in claim 1, wherein the first balancing portion and the second balancing portion are alternatively overlapped with each other, and the first blade portion and the second blade portion are respectively mounted at the opposite sides of the first balancing portion and the second balancing portion, so that the first blade portion and the second blade portion are at different heights.

3. The heat dissipating architecture as claimed in claim 1, wherein the inlet is at the same height with the first blade portion.

4. The heat dissipating architecture as claimed in claim 1, wherein the first blade portion and the second blade portion respectively includes a rejecting portion against the first balancing portion and the second balancing portion, and a plurality of blades mounted on the rejecting portions.

5. The heat dissipating architecture as claimed in claim 4, wherein the widths of the blades of the first and the second blade portions are gradually reduced along with the direction toward the rejecting portions.

6. The heat dissipating architecture as claimed in claim 4, wherein the rejection portion of the first blade portion and the rejection portion of the second blade portion compose a concentric circle.

7. The heat dissipating architecture as claimed in claim 1, wherein the linking portion further includes a flexible section for providing a stretch of the first blade portion and the second blade portion toward opposite directions.

8. The heat dissipating architecture as claimed in claim 1, wherein the linking portion further includes a positioning portion for latching with the counter balancing mass.

* * * * *